United States Patent [19]

Jansing et al.

[11] Patent Number: 4,726,692
[45] Date of Patent: Feb. 23, 1988

[54] GAS-STATIC BEARING WITH SUBDIVIDED BEARING SURFACES

[75] Inventors: Walter Jansing; Ewald Junghans, both of Bergisch Gladbach, Fed. Rep. of Germany

[73] Assignee: Interatom GmbH, Bergisch Gladbach, Fed. Rep. of Germany

[21] Appl. No.: 915,385

[22] Filed: Oct. 6, 1986

[30] Foreign Application Priority Data

Oct. 7, 1985 [DE] Fed. Rep. of Germany ....... 3535744

[51] Int. Cl.$^4$ .................... F16C 32/06; F16C 33/12
[52] U.S. Cl. .................................. 384/107; 384/100; 384/111; 384/279; 384/902
[58] Field of Search ................. 384/99, 100, 107–113, 384/279, 902

[56] References Cited

U.S. PATENT DOCUMENTS

| 2,696,410 | 12/1954 | Topanelian . | |
|---|---|---|---|
| 2,855,249 | 10/1958 | Gérard | 384/279 |
| 2,937,294 | 5/1960 | Macks | 384/111 X |
| 2,983,832 | 5/1961 | Macks | 384/107 X |
| 3,110,525 | 11/1963 | Sternlicht | 384/113 X |
| 3,450,448 | 6/1969 | Weichsel | 384/107 |
| 3,527,510 | 9/1970 | Christiansen | 384/114 |
| 3,837,716 | 9/1974 | Allen et al. | 384/112 |
| 3,934,948 | 1/1976 | Pruvot | 384/111 |
| 4,330,159 | 5/1982 | Kakimoto | 384/100 |
| 4,417,823 | 11/1983 | Drevet et al. | 384/111 X |

FOREIGN PATENT DOCUMENTS 3230232 2/1984 Fed. Rep. of Germany .
81/01449 5/1981 World Int. Prop. O. .

Primary Examiner—Stuart S. Levy
Assistant Examiner—Thomas R. Hannon
Attorney, Agent, or Firm—Herbert L. Lerner; Laurence A. Greenberg

[57] ABSTRACT

A gas-static bearing including a bearing shell formed of porous material compacted at bearing surfaces thereof for supporting a shaft, the bearing surfaces being distributed over a first group of surfaces consisting of at least two cylindrical jacket surfaces disposed concentrically to one another and about a longitudinal axis of the bearing shells and a second group of surfaces consisting of a plurality of circular surfaces disposed in succession along the axis.

9 Claims, 1 Drawing Figure

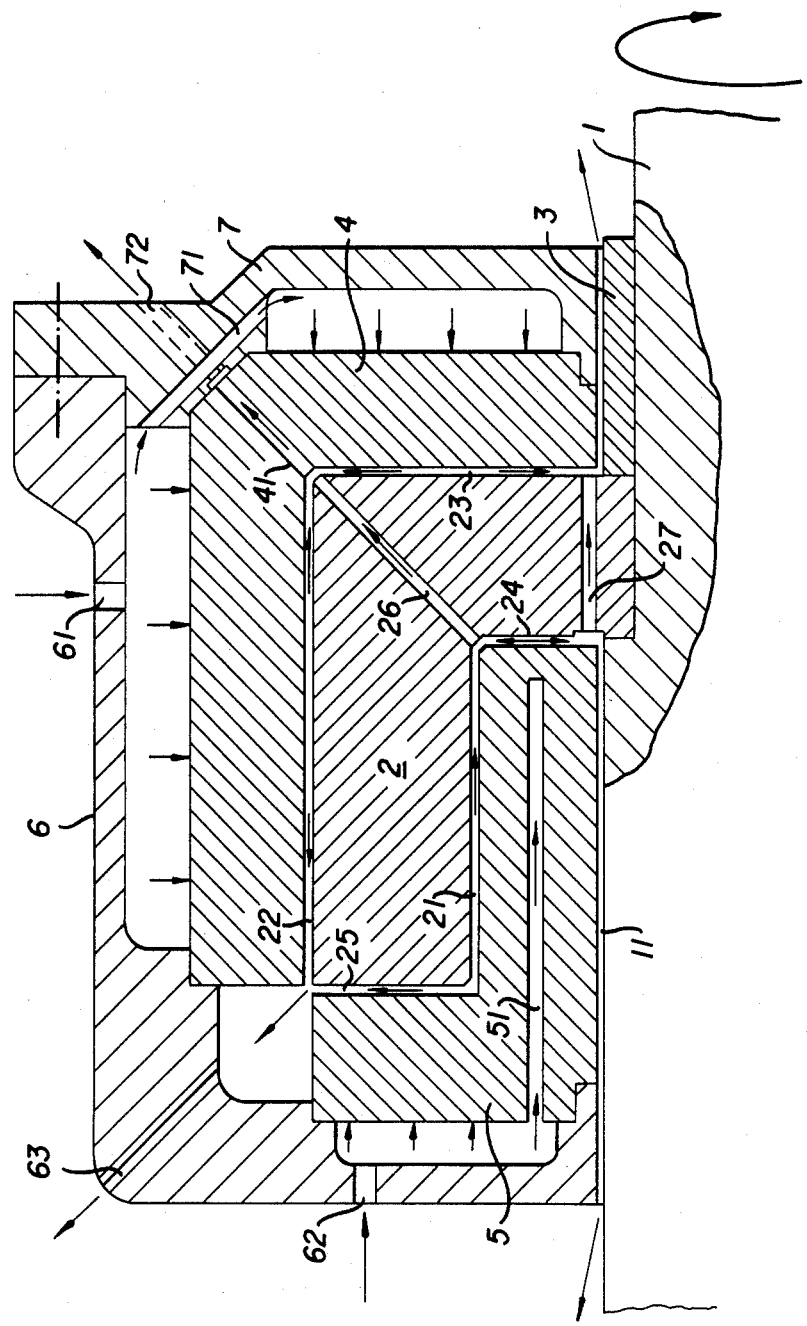

GAS-STATIC BEARING WITH SUBDIVIDED BEARING SURFACES

The invention of the instant application relates to a gas-static bearing including a bearing shell formed of porous material compacted at bearing surfaces thereof for supporting a shaft. In German, Published Prosecuted Application (DE-A) No. 32 30 232, the applicant described a bearing shell and a method for producing it, and discloses in detail how and why such bearing shells permit a shaft to be supported free of vibrations. Because the resistance in the larger, non-compacted portion of the bearing shell which opposes the feed gas flow is relatively low compared to the resistance occurring in the compacted layer, the construction of the bearing shell may differ from the conventional simple hollow-cylindrical form thereof and may, for example, be such as to provide a bearing acting both radially and axially simultaneously. A bearing shell of this general type is described, by way of example, with respect to a supercharger for internal combustion engines in copending U.S. patent application Ser. No. 871,704 filed June 6, 1986 which is assigned to the same corporate assignee as that of the instant application. In this co-pending application, air is used as the feed gas for the bearing, and is diverted from the flow delivered by the supercharger. The feed gas thus has only a relatively low pressure, especially during partial-load operation. Simultaneously, the need arises to decrease the dimensions of the supercharger and thus to limit the space available for the bearing support of its shaft as well. Manufacture could also be facilitated thereby, if the heretofore required, very close tolerances between the bearing shell and the shaft, could be increased or, in other words, if a greater bearing gap could be acceptable.

It is accordingly an object of the invention to provide a gas-static bearing which has very large bearing surfaces while only relatively insignificant enlargement of the dimensions of the bearing is necessary or has bearing surfaces which remain the same as for conventional bearings, yet the gas-static bearing of the invention has smaller dimensions than the conventional bearings. With a moment of inertia which remains the same (that is, with the same capacity for a fast change in rotational speed), the load-carrying capacity of the bearing is increased.

It is another object of the invention to provide a gas-static bearing which, with approximately the same outer dimensions as that of a conventional bearing, has larger bearing surfaces (as a result of which the gas pressure required for its operation can be reduced, or a larger bearing gap width can be tolerated), or to provide a bearing of this general type having outer dimensions which are decreased with respect to those of a conventional bearing while its bearing surfaces remain the same size as for those of the conventional bearing. With the foregoing and other objects in view, there is provided, in accordance with the invention, a gas-static bearing including a bearing shell formed of porous material compacted at bearing surfaces thereof for supporting a shaft, the bearing surfaces being distributed over a first group of surfaces consisting of at least two cylindrical jacket surfaces disposed concentrically to one another and about a longitudinal axis of the bearing shells and a second group of surfaces consisting of a plurality of circular surfaces disposed in succession along the axis. By providing a plurality of bearing surfaces disposed concentrically to one another, the structural length of the bearing can be shortened considerably and, if the structural length of the bearing of the invention remains the same as for a conventional bearing, very much larger surface areas for the radial bearing support can be made available, respectively. The situation is similar for the axial bearing support, where the required bearing surface radius may be reduced, if desired or necessary.

In accordance with another feature of the invention, there is provided a hollow-cylindrical part formed with a base at one end thereof disposed, at least when in use, on a cylindrical part of the shaft.

In accordance with a further feature of the invention, the bearing shell formed of porous material includes a hollow-cylindrical part formed with a flange at one end thereof and surrounding the first-mentioned hollow-cylindrical part.

In accordance with an additional feature of the invention, the bearing shell formed of porous material includes a hol- low-cylindrical part formed with a flange at one end thereof and filling an intermediate space between the cylindrical part of the shaft and the first-mentioned hollow-cylindrical part.

In accordance with an added feature of the invention, the bearing shell includes a first and a second hollow-cylindrical part each formed with a flange at one end thereof and surrounding the first-mentioned hollow-cylindrical part.

The hollow-cylindrical part disposed, at least when in use, on the shaft can also be produced integrally with the shaft, or it may be fitted onto it after being manufactured separately. The foregoing features are applicable especially to the more-probable case in which it is not the shaft but rather the bearing shell that is formed of the porous material which has been compacted at its surface, and consequently offer the additional advantage of simpler assembly.

In accordance with yet another feature, a separate supply line for feed gas is provided for each of the first and the second hollow-cylindrical parts of the bearing shell. With this feature of the invention, the feed gas pressure can be adapted, for example, to requirements which possibly differ in the radial and axial directions.

In accordance with yet a another feature of the invention, at least one of the first-mentioned hollow-cylindrical part and said first and second hollow-cylindrical parts of the bearing shell are formed with flow outlet conduits for spent feed gas. The flow paths for the fresh feed gas and the spent feed gas can thus be separated from one another, to prevent short-circuit flows.

In accordance with yet an additional feature of the invention, flow outlet channels are formed in the first hollow-cylindrical part of the bearing shell, the low outlet channels being sealed off from feed gas supplied to the first hollow-cylindrical part of the bearing shell. The sealing of the flow outlet conduits or channels can be accomplished by inserting special nonporous tubes or the like, or by subsequent machining of the surface of the channels or bores with the objective of closing the pores of the material making up the bearing shell.

In accordance with a concomitant feature of the invention, the hollow-cylindrical part of the bearing shell is formed with approximately axially parallel bores for supplying feed gas therethrough which extend into said hollow-cylindrical part of said bearing shell located between the cylindrical part of the shaft and the first-mentioned hollow-cylindrical part. Due to this construction, a uniform supply of feed gas to the entire bearing shell, and, consequently, a uniform gas pressure in the bearing gap over the surface area of the bearing are facilitated.

Other features which are considered as characteristic for the invention are set forth in the appended claims.

Although the invention is illustrated and described herein as embodied in gas-static bearing with subdivided bearing surfaces, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the single FIGURE of the drawing which is a one-half longitudinal axial sectional view of the gas-static bearing according to the invention.

Referring now to the figure of the drawing, there is shown a shaft 1 which, in the illustrated embodiment is solid but may also be hollow-cylindrical. An auxiliary, hollow-cylindrical part 2 having a base at one end thereof is pushed against a stop or shoulder provided for this purpose on the shaft 1 and is suitably secured on the shaft with the aid of a ring 3. A divided bearing shell includes a first or outer part 4 and a second or inner part 5. The outer part 4 of the bearing shell surrounds the hollow-cylindrical part 2 in radial direction on the outside and, in axial direction, on the base side thereof. The inner part 5 of the bearing shell, which may be manufactured from an austenitic sintered material, is formed of one part which fills an intermediate space between the shaft 1 and the hollow-cylindrical part 2 and a second part which axially supports the hollow-cylindrical part 2 at the open end of the latter. Thus, three radial bearing faces 11, 21 and 22 and three axial bearing faces 23, 24 and 25 are available. The bearing shell 4, 5 is enclosed in a housing 6 having a cap 7. Two openings 61 and 62 are formed in the housing 6, through which separate supplies of gas to the bearing shells 4 and 5 are provided (connecting lines, valves and the like have not been shown in the figure in the interest of simplicity). Further flow of feed gas is indicated by the associated arrows. Bores or channels 71 are provided in the cap 7, through which the bearing surface 23 is supplied with feed gas. In order to assure a uniform supply of gas to the bearing surfaces 11, 21 and 24, the second or inner part 5 of the bearing shell is formed with a plurality of axially parallel bores or channels 51 distributed over the circumference thereof. The spent feed gas flows out partly via a gap located, respectively, between the shaft 1 and the housing 6, on the one hand, and between the ring 3 and the cap 7, on the other hand, and partly via special additional bores 63 and 72, formed in the housing 6 and the cap 7, respectively (the bore 72 being drawn offset and not actually intersecting the bore 71). Similarly, flow outlet bores or channels 26 and 27 are formed in the hollow-cylindrical part 2, and a flow outlet bore or channel 41 is formed in the first or outer part 4 of the bearing shell. In order to maintain a separation between fresh and spent feed gas and thus prevent the formation of short-circuit flows, the surface defining the bore 41 in the outer part 4 of the bearing shell is subsequently machined in such a manner that its pores become closed.

There is claimed:

1. A gas-static bearing comprising a bearing shell formed of porous material compacted at bearing surfaces thereof for supporting a shaft, said bearing surfaces being distributed over a first group of surfaces consisting of at least two cylindrical jacket surfaces disposed concentrically to one another and about a longitudinal axis of said bearing shells and overlapping one another in the direction of said longitudinal axis, and a second group of surfaces consisting of a plurality of circular surfaces disposed in succession along said axis and overlapping one another in a direction transverse to said axis.

2. A bearing according to claim 1, including a hollow-cylindrical part formed with a base at one end thereof disposed, at least when in use, on a cylindrical part of the shaft.

3. A bearing according to claim 2 wherein said bearing shell formed of porous material includes a hollow-cylindrical part formed with a flange at one end thereof and surrounding the first-mentioned hollow-cylindrical part.

4. A bearing according to claim 2 wherein said bearing shell formed of porous material includes a hollow-cylindrical part formed with a flange at one end thereof and filling an intermediate space between the cylindrical part of the shaft and the first-mentioned hollow-cylindrical part.

5. A bearing according to claim 2 wherein said bearing shell includes a first and a second hollow-cylindrical part each formed with a flange at one end thereof and surrounding the first-mentioned hollow-cylindrical part.

6. A bearing according to claim 5 including a separate supply line for feed gas provided for each of said first and said second hollow-cylindrical parts of said bearing shell 7. A bearing according to claim 5 wherein at least one of said first-mentioned hollow-cylindrical part and said first and second hollow-cylindrical parts of said bearing shell are formed with flow outlet conduits for spent feed gas.

8. A bearing according to claim 7 having flow outlet channels formed in said first hollow-cylindrical part of said bearing shell, said flow outlet channels being sealed off from feed gas supplied to said first hollow-cylindrical part of said bearing shell.

9. A gas-static bearing comprising a bearing shell formed of porous material compacted at bearing surfaces thereof for supporting a shaft, said bearing surfaces being distributed over a first group of surfaces consisting of at least two cylindrical jacket surfaces disposed concentrically to one another and about a longitudinal axis of said bearing shells and a second group of surfaces consisting of a plurality of circular surfaces disposed in succession along said axis, a hollow low-cylindrical part formed with a base at one end thereof disposed, at least when in use, on a cylindrical part of the shaft, said bearing shell formed of porous material including a hollow-cylindrical part formed with a flange at one end thereof and filling an intermediate space between the cylindrical part of the shaft and the first-mentioned hollow-cylindrical part, said hollow-cylindrical part of said bearing shell being formed with approximately axially parallel bores for supplying feed gas therethrough which extend into said hollow-cylindrical part of said bearing shell located between the cylindrical part of the shaft and the first-mentioned hollow-cylindrical part.

* * * * *